April 6, 1965 | W. FINGERLE, JR | 3,177,302

TELEPHONE REPEATER

Filed March 9, 1962 | 3 Sheets-Sheet 1

INVENTOR

William Fingerle, Jr.

BY Moore & Hall

ATTORNEYS

April 6, 1965 W. FINGERLE, JR 3,177,302

TELEPHONE REPEATER

Filed March 9, 1962 3 Sheets-Sheet 2

INVENTOR

William Fingerle, Jr.

BY [signature]

ATTORNEYS

TELEPHONE REPEATER

Filed March 9, 1962

INVENTOR

William Fingerle, Jr.

BY Moore & Hall

ATTORNEYS

United States Patent Office 3,177,302
Patented Apr. 6, 1965

3,177,302
TELEPHONE REPEATER

William Fingerle, Jr., Cos Cob, Conn., assignor to Budelman Electronics Corporation, Stamford, Conn., a corporation of New York Filed Mar. 9, 1962, Ser. No. 178,597
7 Claims. (Cl. 179—170)

The present invention relates to a voice frequency repeater adapted to improve transmission on existing substandard subscriber and trunk circuits; and is more particularly concerned with an improved hybrid telephone repeater adapted to effect significant economies in installation, setup and maintenance. In this respect, the instant application comprises a continuation-in-part of a prior copending application of William Fingerle Jr., and Earl F. Howlett, Serial No. 61,259, filed October 7, 1960, for "Voice Frequency Hybrid Telephone Repeater."

As is well known at the present time, voice frequency repeaters, located either at a central office or at a remote position, are often associated with telephone lines at positions between subscribers and/or telephone exchanges to compensate for attenuation produced during voice transmissions, thereby to improve such transmissions. One well-known form of voice frequency repeater is the so-called hybrid repeater which normally contains a pair of identical amplifiers, one for amplifying voice currents in a first direction, the second to increase the signal level of voice currents in an opposite direction; said amplifiers being prevented from interacting into one another by a directional circuit device known as a hybrid network. Known circuits of this type are generally complex and relatively bulky equipments representing costly installations. These known forms of circuits, moreover, are normally so arranged that they have at least four manually adjustable controls thereon, comprising a pair of hybrid balance controls and a pair of gain controls associated respectively with the two amplifiers discussed above; and these four controls must normally be manipulated simultaneously to set up the equipment for maximum gain and balance in both directions of transmission. The very nature of such structures suggested heretofore, and the form of setup controls normally provided, necessitated that highly specialized test equipment and technical know-how be utilized during an initial setup procedure; and in addition, the time required to set up such known forms of circuitry has been appreciable.

Field surveys have indicated, however, that in over 90% of all lines in need of voice frequency amplification, expensive repeaters of the type normally sold heretofore are actually unnecessary; being capable of voice amplifications and refinements of control far in excess of those actually required to effect a desired improvement in voice transmission quality. Moreover, the significant setup time and special test equipment which has necessarily been employed with voice frequency repeaters of types heretofore utilized has rendered the use of such equipments (particularly in light of their high initial cost) uneconomical in many installations.

The present invention, recognizing these characteristics of voice frequency repeaters suggested heretofore, is concerned with the provision of a highly simplified repeater which can be manufactured and sold at a fraction of the cost of equipments available heretofore. Moreover, the simplified equipment of the present invention is so constructed that it may be installed more quickly and easily than equipments used heretofore; and can in fact be adjusted to a given circuit without the use of special test equipment or technical know-how, and indeed, through the use of only a lineman's test hand set. The simplification in test equipment necessary with the present invention is further characterized by a set-up time in the order of minutes, rather than hours which may have been necessary heretofore, thereby making the equipment feasible in many installations wherein complex test equipment and highly qualified personnel are not available.

With all the foregoing advantages, the present invention is, as will appear, further designed not only to improve transmission on existing circuits, but also to obtain considerable system construction economies by permitting the use of lower cost small size cable gauges and lower conductivity open wire facilities than have been considered economically feasible heretofore when only the more complex and costly equipments characteristic of the prior art have been available.

It is accordingly an objective of the present invention to provide an improved voice frequency repeater which is simpler in construction and which can be installed more quickly and easily than has been possible heretofore.

A further object of the present invention resides in the provision of an improved voice frequency repeater which can be more rapidly set up and adjusted to a given circuit than has been possible heretofore; and in particular, wherein the equipment setup can be effected by relatively unskilled personnel and without the use of highly specialized test equipment.

Still another object of the present invention resides in the provision of an improved voice frequency repeater of the hybrid type which has fewer setup controls than has normally been the case heretofore.

Another object of the present invention resides in the provision of an improved voice frequency repeater having a signalling bypass circuit for D.C. and ringing currents, as well as means adapted to compensate for undesired feedback, impedance variations, and gain limitations which could, in the absence of such means, otherwise occur as a result of said bypass circuit.

A still further object of the present invention resides in the provision of a voice frequency repeater adapted for use with both loaded and unloaded telephone lines, said repeater including a compensating or equalizer network adapted to compensate the repeater for use with a given non-loaded line.

A still further object of the present invention resides in the provision of a voice frequency repeater which is more rugged and foolproof in circuit design, and which takes up less rack space and consumes less power than repeaters available heretofore.

Other objects of the present invention reside in the provision of an improved voice frequency repeater so arranged, in respect to improved control circuits associated therewith, that said repeater is deenergized during idle periods, and further reside in the provision of certain other objects resulting inter alia from such deenergization, i.e. battery life may be increased, separate idle-line terminations can be eliminated, and singing during idle periods can be positively prevented thereby permitting the repeater to be set up for higher gains during operating conditions.

In providing for the foregoing objects and advantages, the present invention contemplates the provision of a voice frequency hybrid telephone repeater designed to amplify speech currents in both directions on subscriber or trunk telephone lines. The repeater, as will be described, is provided with D.C. and ringing current bypass circuitry, and is fully transistorized, requiring only 16.0 millamperes of operating power per repeater from a 12/24/48 volt D.C. operating battery. The repeater is compact and of rugged construction; and includes a pair of transistor amplifiers associated, as will be described, with various impedances comprising a hydrid network operating in a manner essentially similar to those well known heretofore.

The amplifiers, and their associated hybrid network, are in turn associated with a pair of hybrid balance controls as well as with a gain control which can be operated to adjust the gain of both amplifiers simultaneously. The number of adjustments may thus be reduced from four (conventional heretofore) to three, by causing the gain of both amplifiers to be varied in the same sense, and by substantially the same amount simultaneously. As will appear, this use of a common gain control when it is employed, assures that the amplifier gains in both directions are always established at substantially the same level; and as a result, setup of the equipment becomes substantially independent of amplifier gain, and reduces essentially to a hybrid balance adjustment only. While on first impression this simplification of controls may appear of little importance, it has actually proved in practice to be of considerable value; and the complexity of set up is reduced to substantially 25% of that normally required heretofore without appreciably detracting from the accuracy of the final setup.

The equipment is, moreover, associated with a pair of monitor jacks adapted to receive a lineman's hand set; and the arrangement is such that, as will be described, various singing currents normally present in hybrid repeaters are monitored and used directly to effect setup of the equipment. By this arrangement, therefore, and by appropriate attention to a setup procedure which will be described, the equipment can be readily set up for maximum and substantially equal gains or for like final amplification results, in both directions simply by manipulating the various gain and balance controls on the equipment while simultaneously listening for characteristic tone changes. The setup thus afforded can be effected in a matter of minutes, in distinction to the much longer setups which have been necessary heretofore even when highly specialized test equipment was employed.

As will also appear, the repeater of the present invention is characterized by the provision of an impedance network so arranged that the effect of line impedance changes, upon the hybrid of the repeater, are minimized thus rendering certain compensating networks, considered essential heretofore, unnecessary. In this respect, it might be noted that it has been suggested heretofore that, when a particular loaded line is employed, the hybrid portion of the repeater associated with that line should have a frequency versus impedance characteristic corresponding to that of the loaded line. As a result of this customary approach to the problem of repeaters on loaded lines, the hybrid networks of such repeaters have taken the form of complex impedance arrays which have themselves ordinarily required setup along with the remainder of the equipment at the time the equipment is originally installed; and as a result, the cost of the equipment and the setup time required has been increased even further. All such considerations have been eliminated by the system of the present invention.

In addition, as will appear hereinafter, the repeater of the present invention, by reason of various features incorporated therein, exhibits longer battery life, higher possible gain without singing, and less undesired feedback of audio signals than has been possible heretofore even in far more expensive and complex equipments.

The foregoing objects, advantages, construction and operation of the present invention will become more readily apparent from the following description and accompanying drawings, in which:

FIGURE 5 illustrates a still further modified portion of the circuit shown in FIGURE 3.

Figure 1:
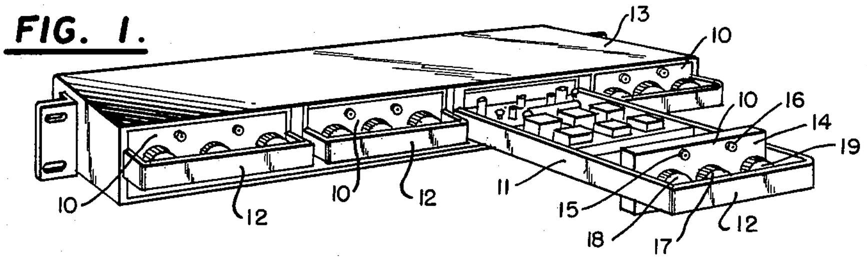
FIGURE 1 is a perspective view of a plurality of repeaters constructed in accordance with the present invention, and assembled in an appropriate mounting rack or box.
Figure 1A:
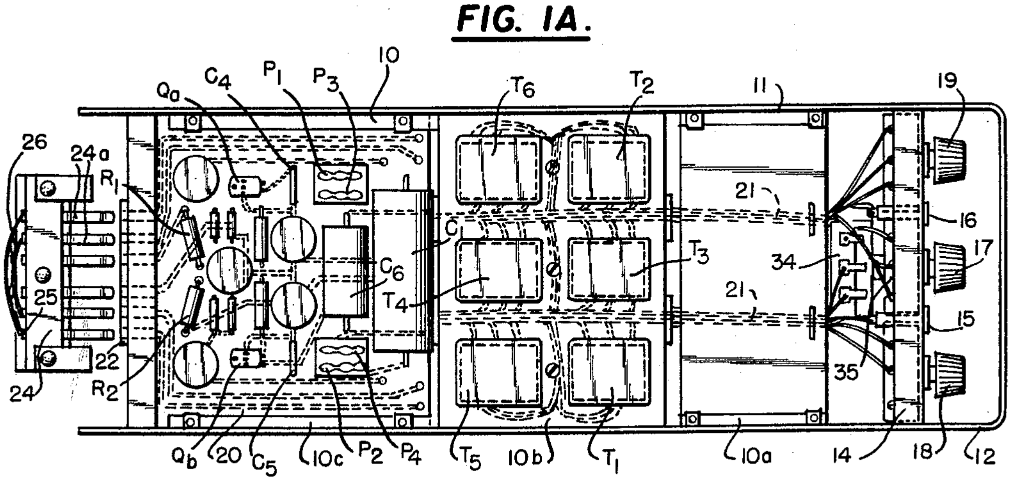
FIGURE 1A is a top view of an individual one of the repeaters shown in FIGURE 1, and its associated connector.
Figure 1B:
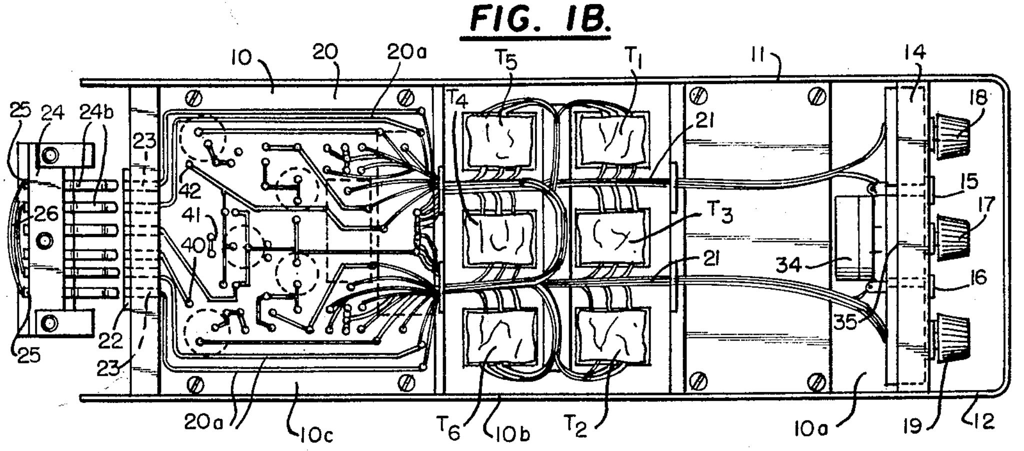
FIGURE 1B is a bottom view of the repeater and connector shown in FIGURE 1A.

Referring now to FIGURES 1, 1A and 1B, it will be seen that, in accordance with the present invention, a repeater 10 may take the form of a chassis comprising a U-shaped frame member 11, the forward portion of which acts as a handle 12, said frame member 11 being adapted to slidably ride on complementary tracks in a mounting rack or box 13. As illustrated in FIGURE 1, a plurality of repeaters 10 may be placed in a given mounting box 13 in side-by-side relation. In this respect, a commercial embodiment of the repeater 10, sold by Budelman Electronics Corporation, Stamford, Connecticut, is substantially four inches wide, one and a half inches high, and has an overall depth of twelve inches; whereby four such repeaters may be mounted in a single standard 19-inch mounting box 13 having a height of 1¾ inches.

Each of the repeaters 10 is divided into essentially three structural sections, designated, in FIGURES 1A and 1B, as sections **10*a*, 10*b* and 10*c* respectively. Section 10*a*, disposed adjacent the forward end or handle 12 portion of the repeater 10, includes a panel 14 provided thereon with a pair of monitor jacks 15 and 16 into which a lineman's hand set may be plugged for the audible setup procedure of which the present equipment is capable. In addition, the panel 14 provided in section 10*a* of the repeater has a gain control 17 mounted thereon as well as a pair of hybrid balance controls 18 and 19 which are provided for the setup procedure to be described; and each of these several controls 17, 18 and 19, comprises, as will appear hereinafter, potentiometer means appropriately connected to other portions of the circuit by conductors included in the groups of conductors 21**, to also be described.

The hybrid balance controls 18 and 19 normally comprise a single potentiometer, whereas the gain control 17 normally comprises a pair of potentiometers 34 and 35 placed back-to-back. When the gain control potentiometers thus provided are to be associated with a single control knob for ganged operation, a single shaft can be provided for both of these back-to-back gain potentiometers. In some installations, however, the customer may still desire to effect individual controls of gain, and in such cases the back-to-back potentiometers 34 and 35 can be associated with a pair of shafts which extend through the front of panel 14 in concentric relation to one another. These concentric shafts can, moreover, be associated with a pair of knobs so situated with respect to one another physically that the knobs can be grasped simultaneously when it is desired to effect simultaneous gain controls (as will be described); and further so arranged that the knobs can be individually adjusted when separate gain adjustments are desired. In any event, once the equipment is plugged into its associated mounting box 13, a lineman's hand set may be plugged first into one of the jacks 15 or 16 and then into the other jack; and by appropriate manipulation of the controls 17 through 19 (as will be described) the equipment can be quickly set up.

Repeater section **10*b***, disposed substantially in a central portion of the repeater chassis, comprises in essence, six transformers T1 through T6 inclusive, mounted in an array as illustrated. The functions and electrical interconnection of said transformers T1 through T6 inclusive will be more fully identified hereinafter, particularly in connection with the schematic of FIGURE 3.

Finally the rearward section of the repeater, section 10*c*, comprises a printed circuit board 20 having a plurality of conductive deposits 20*a* on its underside (see FIGURE 1B), forming portions of the circuit to be described hereinafter in reference to FIGURE 3; and the upper side of said board 20 includes a plurality of components which are identified in FIGURE 1A by numerals which correspond to like numbered components shown schematically in FIGURE 3. The several components mounted on the upper side of printed circuit board 20 are connected in accordance with known techniques to the conductive deposits 20*a* on the underside of said board 20; and the resulting circuit, so formed, is interconnected to the various transformers T1 through T6 located in section 10*b* of the repeater, as well as to the jacks 15 and 16 and to the controls 17 through 19 inclusive, by means of conductors 21 tied together into bundled or cable-like arrays.

Figure 3A:
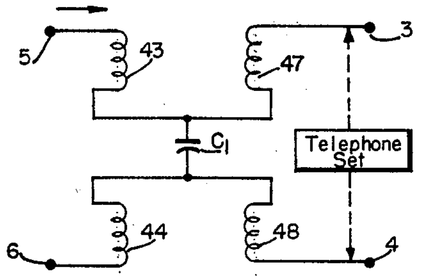
FIGURE 3A is a schematic diagram of a portion of the circuit shown in FIGURE 3.
Figure 3:
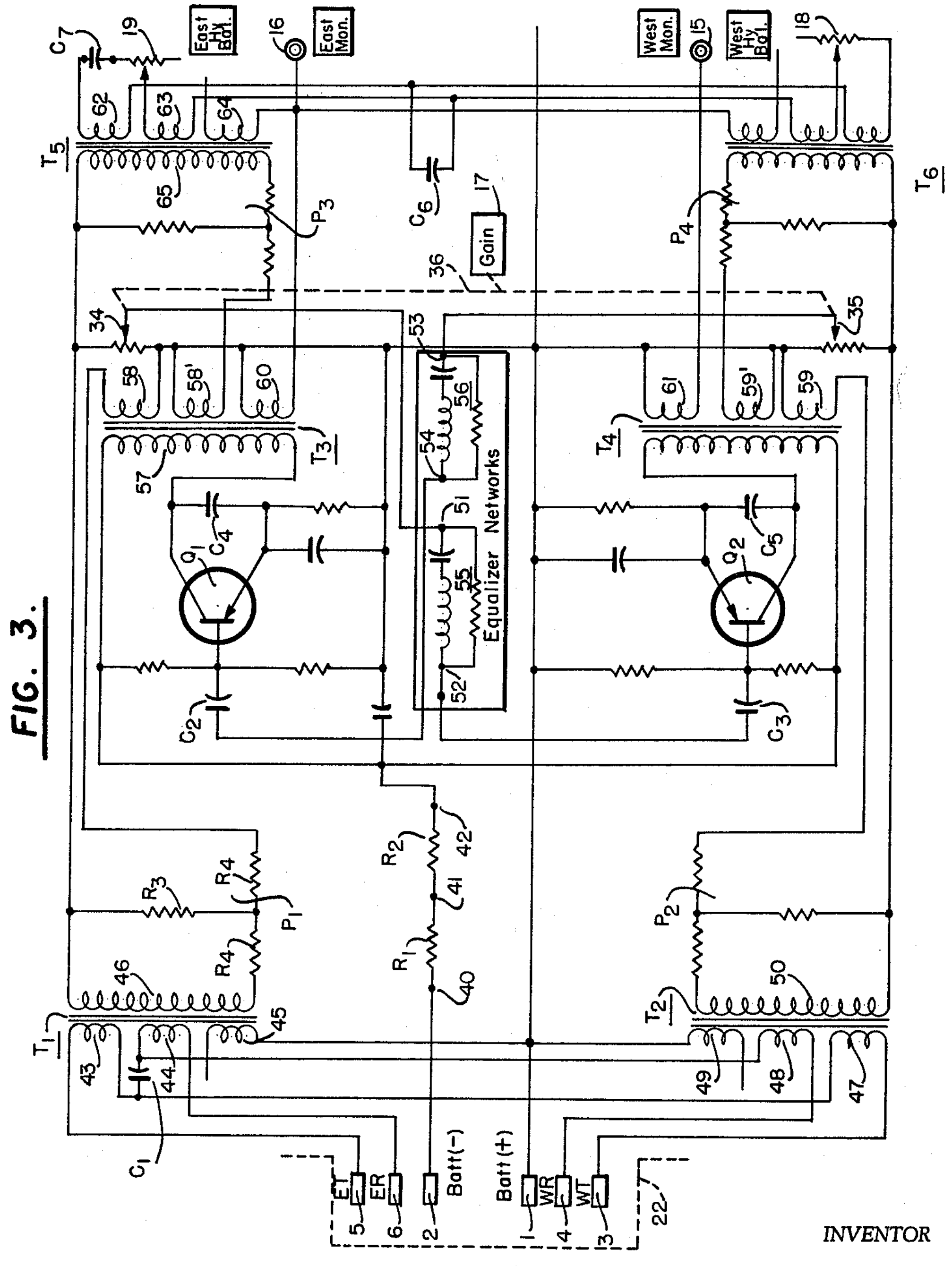
FIGURE 3 is a schematic diagram of a repeater, of the type shown mechanically in FIGURE 1, and constructed in accordance with the present invention.

At the rearwardmost end of each repeater 10, the printed circuit board 20 is provided with a tongue-like section or printed circuit plug 22 carrying on its underside six printed deposits 23 forming in essence terminals 1 through 6 inclusive of FIGURE 3, i.e. two pairs of East and West line terminals and a further pair of battery terminals. The conductive deposits 23, i.e. the six terminals 1 through 6 (see FIGURE 3), cooperate with a combination six-pole connector and switch 24 located in mounting box 13 at the rear of each repeater position and operating to provide six connections to the printed circuit plug 22 at the rear of each said repeater 10.

To this effect, each connector 24 is provided with a plurality of pairs of contact springs, i.e. six contact springs 24*a* located adjacent the upper side of the connector and six further contact springs 24*b* located on the underside of the connector 24. The various contact springs 24*a* and 24*b* are normally biased into contact with one another, and are further interconnected to conductive tabs 25 which are appropriately interconnected to one another by means of conductors 26 so that when the repeater, associated with a given connector 24, is not in position in rack 13, all contact pairs in that particular connector 24 are closed together to provide double circuit closures consistent with normal service in the various telephone lines. The contact springs 24*a* and 24*b* in a given connector are separated by insertion of the plug 22 of a repeater therebetween. Upon such separation of the springs 24*a* and 24*b*, the lower blades 24*b* connect with the various conductive deposits 23 on the underside of printed circuit plate 20, thereby to make appropriate electrical connections to and from the repeater. The vertically aligned contact pairs 24*a*–24*b* are otherwise open, since the upper contact springs 24*a* merely ride on a non-conductive portion of the printed circuit board 20 upper side.

When one of the repeaters is pulled from the rack, e.g. in the manner illustrated in FIGURE 1, all of the contact pairs in the connector 24 otherwise associated with that particular repeater close together to restore the telephone line to normal service. All wiring is permanently connected to the connectors 24 and may be cabled in a horizontal run across the rear of the box 13.

Figure 2:
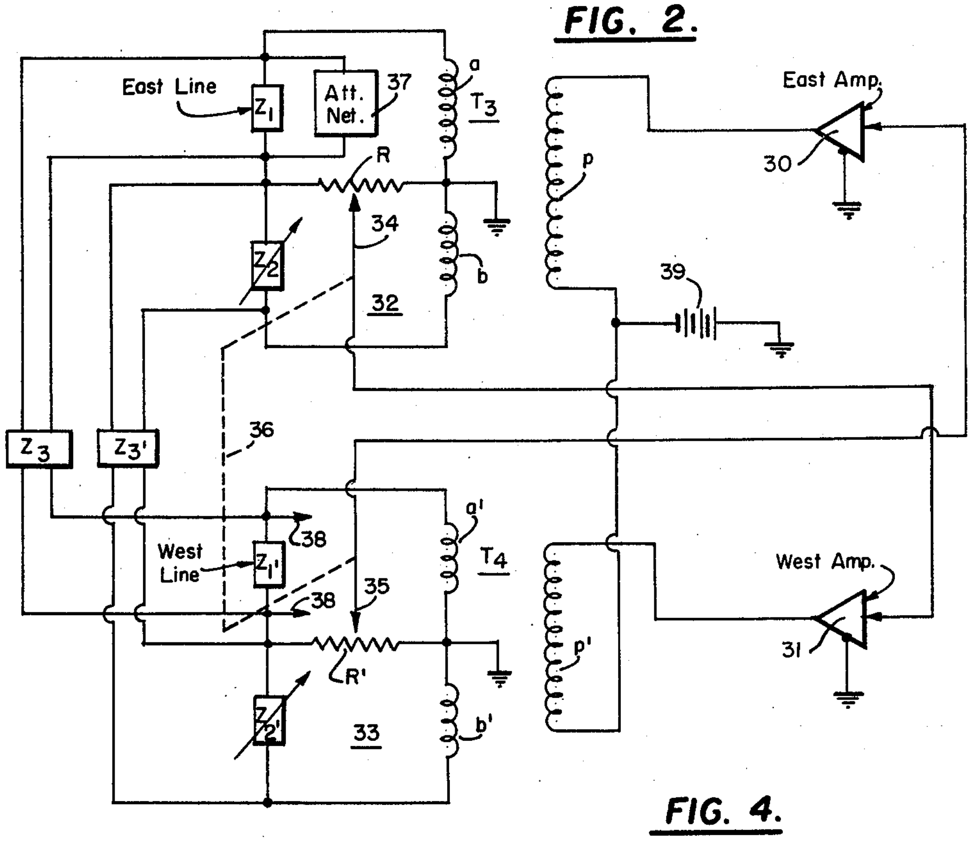
FIGURE 2 is an equivalent circuit of a voice frequency hybrid telephone repeater embodying the improvements of the present invention.

Each of the repeaters 10 includes a plurality of components which, in simplest form, corresponds to the equivalent circuit shown in FIGURE 2. In order therefore that the general operation of the structure may first be understood, reference will now be made to FIGURE 2. The operation to be described, moreover, will be rather simplified since, in certain respects, it corresponds to the operation of hybrid telephone repeaters which are per se well known.

As illustrated in FIGURE 2, a hybrid repeater may take the form of a network adapted to transmit and amplify voice currents from an East line designated Z1 to a West line designated Z1′; or in the reverse direction, namely from Z1′ to Z1. Amplification in the two directions is accomplished by an East amplifier 30 and a West amplifier 31 respectively; and interaction between transmissions in the two directions is prevented by hybrid networks generally designated 32 and 33, with hybrid network 32 being balanced by an East hybrid balance designated Z2, and hybrid network 33 being balanced by a West hybrid balance designated Z2′. The hybrid balances Z2 and Z2′ can each take the form of an adjustable rheostat (i.e. it can be resistive only); or in the alternative, it can comprise a simple series and/or parallel resistor and capacitor having an impedance varying with frequency.

The incoming and outgoing lines, and the hybrid networks, are coupled to the amplifiers 30 and 31 by transformers designated T3 and T4, these designations being selected to correspond to similar such designations in FIGURE 3, to be described. Transformer T3 includes a primary winding *p* and a pair of secondary windings *a* and *b*, while transformer T4 includes a primary winding *p′* and a pair of secondary windings *a′* and *b′*. The networks further include gain controls 34 and 35 which may be ganged to one another as at 36. The East and West portions of the circuit are entirely symmetrical.

The East and West lines Z1 and Z1′ are further shunted by a signalling bypass for D.C. and ringing currents, designated in FIGURE 2 as impedance Z3. A compensating network Z3′ is, in accordance with one of the particular improvements of the present invention, shunted across the hybrid balances Z2 and Z2′, for purposes to be described hereinafter.

In operation, let us first assume that a signal comes in on the East line Z1. A portion of this signal is developed across the resistive portion R of gain control 34, and is fed therefrom to the input of the West amplifier 31. The output of the West amplifier appears across primary winding *p′* of transformer T4 and produces a balanced voltage across the secondary windings *a′*, *b′* in the West hybrid network 33. A portion of this voltage is then fed out on the West line Z1′.

If the impedance of West line Z1′ and the West hybrid balance Z2′ equal one another, no portion of the output of West amplifier 31 will appear across resistive portion R′ of gain control 35; and accordingly no voltage from the output of West amplifier 31 will appear at the input of East amplifier 30. This is the so-called "balance condition" of the hybrid, and prevents (as is desired) the output of the West amplifier from feeding back into the East amplifier. It will be appreciated, of course, that due to the symmetry of the system, the same interaction is prevented when a signal comes in on the West line Z1′ and is to be transferred to the East line Z1′; and no interaction between the amplifiers 30 and 31 occurs if, once more, the East hybrid 32 is "in balance." The arrangement is such that once proper balance conditions are achieved, bidirectional amplification, without interaction, is effected.

If we should assume now that the hybrids 32 and 33 are in an unbalanced condition, then when a signal is being transferred from East line Z1 to West line Z1′, a portion of the output of West amplifier 31 will be developed across resistive portion R′ of gain control 35 and will be fed therefrom back to the input of East amplifier 30 and thence, through the East hybrid network 32, back to the input of West amplifier 31. This feedback current causes an oscillating condition to occur in both amplifiers; and characteristic sounds, designated "howl" or "singing condition" or a "hollow" sound, can be detected by causing the oscillating current to be monitored. Similarly, by so monitoring these oscillating currents, and by effecting appropriate adjustments of the gain control 34–35, and the hybrid controls Z2 and Z2′, changes in the sound being monitored and the achieving of a null condition can be utilized to set up the equipment; and such monitoring is in fact employed, as will be described, in the setup of the hybrid repeater of the present invention. The amount of signal feedback which occurs during an unbalanced condition of the hybrids depends upon both the hybrid balance setting of the controls Z2 and Z2' and upon the setting of the gain control 34 or 35 in a given one of the hybrids 32 and 33.

One of the prime purposes of the present invention is to permit easier and quicker setups as well as to effect the simplifications in circuit design, e.g. of types already discussed. In achieving the foregoing purposes, the gain controls 34 and 35 may, as already discussed, be ganged to one another as at 36, or the gain control knobs of a pair of separate gain controls can be so physically positioned relative to one another, that both gain adjustments can be effected in a single control function. As a result of this arrangement, the gain of both amplifiers, in effect, may be caused to vary in the same sense and by substantially the same amount simultaneously; and the end result is that the amplifier gains in both directions are always established at substantially the same level. Accordingly, setup operations become substantially independent of amplifier gain and reduce essentially to hybrid balance only.

In further improving the repeater operation, and as illustrated in FIGURE 2, the structure of the present invention takes into account the existence and effect of the signalling bypass circuit provided between the ends of the repeater, and designated in FIGURE 2 as Z3. In this respect, such signalling bypasses normally comprise reactive components, e.g. inductances comprising transformer windings and associated capacitors. The signalling bypass circuit thereby exhibits impedance variations and a feedback path over the frequency range to which the repeater may be subjected which, unless compensated for, will seriously limit the effective performance of the repeater. The improved repeater of the present invention accordingly employs, as illustrated in FIGURE 2, an additional compensating network Z3' adapted to counteract and compensate for certain disadvantages (to be described hereinafter) which would otherwise occur by reason of such signalling bypass circuit impedance variation and feedback.

The attenuating network 37 (and the similar such network which can be coupled to terminals 38) is also of importance in simplifying the structure and improving operation of the amplifier. As will be described, the attenuation portion of the network 37 may take the form of a resistive T-pad shunted across the East line (with another such pad being shunted across the West line) and this pad reduces the complexity of the balance problem by minimizing telephone line impedance variations when the line is caused to be open-circuited or short-circuited (i.e. when the line is not in use).

It has been the practice heretofore, when repeaters are employed with loaded lines, to utilize hybrid balance networks for the illustrated impedances Z2 and Z2' which exhibit an impedance versus frequency characteristic the same as that of the loaded line. The impedances Z2 and Z2' have accordingly taken the form of complex costly impedance networks which themselves have to be set up in the field to correspond to the impedance variations which may be exhibited on a particular line; and this in turn has caused the cost of repeaters and the time of the setup to be increased considerably. In accordance with the present invention, however, it is recognized that the loaded telephone lines commercially available have impedance versus frequency characteristics which are essentially constant, and any variations from this "flat" impedance characteristic are reduced to acceptable limits by the attenuating pads mentioned above, and to be described hereinafter. When the repeater of the present invention is used with a loaded cable, therefore, compensation for impedance variations is not ordinarily necessary.

It is, of course, possible for the repeaters of the present invention to be employed with non-loaded cables in one or both telephone lines; and in such cases provision is made in the repeater for the addition of a compensating or equalizer network. This additional network adjusts the frequency response of the amplifier, in both directions of transmission where said amplifier is associated with a non-loaded cable, in such manner that the amplifier has a greater gain at the high frequency end of its amplification range, thereby to compensate for the fact that the non-loaded cable associated therewith would normally exhibit a higher loss at the said high frequency end. Moreover, since the impedance of a non-loaded cable drops at the high frequency end, the balance potentiometer of the balanced network associated with a non-loaded cable (and this may, as before, be in either or both directions of transmission) is disposed in series or shunt, or both, with a capacitor to adjust the impedance characteristic of the balanced network so that it corresponds more closely to that of the non-loaded line. This also will appear hereinafter. The essential feature to be recognized, however, is that the repeater of the present invention is so arranged that it may be immediately employed with commercially available loaded lines and, by simple modification, can also immediately be employed with non-loaded lines. In either case, the resulting repeater structure is far simpler than that suggested heretofore and can be set up far more quickly, without special equipment, and by relatively unskilled personnel.

A particular embodiment of the present invention is shown in the schematic of FIGURE 3; and the overall arrangement shown in this schematic is intended to correspond to the repeater shown mechanically in FIGURES 1A and 1B. To this effect, the mechanical structure depicted in FIGURES 1A and 1B includes a number of numerals which correspond to the components shown schematically in FIGURE 3, and to be discussed hereinafter.

As illustrated, signals are coupled to and taken from the repeater at the six-pin plug 22 already described in reference to FIGURES 1A and 1B; and the six pins of said plug 22 have been designated by numerals 1 through 6 inclusive. Pin 1 is, as illustrated, a battery plus (or in some cases a common ground) connection. Pin 2 is a negative battery connecton. Pins 3 and 4, designated respectively WT and WR, are the so-called "tip" and "ring" external connections to the West telephone line; and the pins 5 and 6, designated by the numerals ET and ER respectively, are like tip and ring external connections to the East telephone line.

Referring first to the battery terminals 1 and 2, it should be noted that, in practice, a battery such as 39 (see FIGURE 2) may be connected across said pins 1 and 2 to supply operating potentials for the transistor amplifiers to be described. This battery may be self-contained in the equipment, or may comprise an operating battery located at the central station. The battery itself may provide outputs of 12, 24 or 48 volts D.C.; and a voltage divider comprising resistors R1 and R2 in association with terminals 40, 41 and 42 (see FIGURES 1A and 1B, as well as FIGURE 3) is provided to adapt the equipment for the particular battery voltage actually available. When a 12-volt source is available, terminals 40 and 42 are connected to one another thereby to short circuit both of dropping resistors R1 and R2. Terminals 41 and 42 are connected to one another when a 24-volt supply is available, thereby to short circuit only resistor R2; and no interconnection of terminals 40, 41 and 42 is effected when a 48-volt supply is available, whereby both of dropping resistors R1 and R2 are utilized.

The East line is, as mentioned previously, inserted between pins 5 and 6, while the West line is inserted between pins 3 and 4; and for purposes of simplicity, the actual telephone lines have not been illustrated. An input transformer arrangement T1 and T2 is also provided, coupled as shown to pins 3 through 6 inclusive to isolate the hybrid networks from the telephone line and to provide a signalling bypass (i.e. a bypass for low frequency ringing signals). The transformer arrangement T1, T2 also provides a D.C. path bypassing the repeater for D.C. dialing and talking currents, but acts to connect the repeater into the telephone line at frequencies between 300 and 3,000 cycles.

The arrangement of transformers T1 and T2 is such that they provide a precision balanced impedance in series with both sides of the line and off ground to isolate central office equipment unbalances thereby to minimize noise problems. Transformers T1 and T2 are preferably of the line-to-line type, having a 1,000 ohm input and output impedance to match 900–1100 ohm impedance plant facilities, although they may also be tapped or otherwise modified to match other impedances.

To further clarify the foregoing structure, it should be noted that the input transformer T1 comprises two primary windings designated 43 and 44, a secondary winding 46, and a monitor winding 45. The input transformer T2 similarly comprises two primary windings 47 and 48, as well as secondary winding 50 and a monitor winding 49. Monitor winding 45 of transformer T1, and monitor winding 49 of transformer T2 are both connected to the battery plus terminal 1 (or to ground), but are not otherwise connected to any other components. In the physical transformers, monitor winding 45 is disposed between primary windings 43 and 44 of transformer T1, whereas monitor winding 49 is physically disposed between windings 47 and 48 of transformer T2; and inasmuch as both of the windings 45 and 49 are connected to the battery plus terminal 1, or to ground, the additional windings 45 and 49 in effect act as electrostatic shields tending to achieve a higher order of longitudinal balance.

Primary winding 43 of transformer T1, is, as shown, connected at one of its ends to East terminal 5; and the other end of winding 43 is connected to a capacitor C1 as well as to one end of primary winding 47 in transformer T2. The other end of winding 47 is in turn connected to West terminal 3. A like arrangement can be traced with respect to primary windings 44 and 48, and with respect to terminals 4 and 6; and this particular portion of the circuit, i.e. windings 43, 44, 47 and 48, capacitor C1, and terminals 3 through 6 inclusive, can be redrawn in the manner shown in FIGURE 3A for clarity.

FIGURE 3A actually shows that portion of the input circuit which comprises a signalling bypass for D.C. and ringing currents. In practice, this signalling bypass permits current to flow from terminal 5 through transformer windings 43 and 47 to terminal 3 and thence through the telephone set (which is coupled effectively between terminals 3 and 4) to terminal 4 and back through windings 48 and 44 to terminal 6. Inasmuch as the current so flowing is D.C. or relatively low frequency A.C., the windings 43, 47, 48 and 44 produce substantially no attenuation to the current. Moreover, it will be noted that the circuit of FIGURE 3A is truly a signalling bypass since, for D.C. and very low frequency A.C. ringing currents, a low impedance path is provided between terminals 5 and 6 (and/or between terminals 3 and 4) which effectively bypasses the repeater.

Capacitor C1, shown in FIGURE 3, is interconnected to the several transformer primary windings in the manner shown more clearly in FIGURE 3A. This capacitor C1, at D.C. as well as at the relatively low frequencies of A.C. ringing currents, exhibits a sufficiently high impedance that it, in effect, represents an open circuit; and the capacitor C1 does not therefore alter the bypass operation described. Capacitor C1 is selected to have an appreciably lower impedance at the audio frequencies for which the repeater is designed; and accordingly any such audio frequencies, appearing for example between terminals 5 and 6, see essentially a short circuit between windings 43 and 44 of transformer T1 (and conversely audio signals impressed on terminals 3 and 4 see essentially this same short circuit between windings 47 and 48 of transformer T2). Moreover, at these audio frequencies, the impedances of the various transformer windings 43, 44, 47 and 48 are appreciably higher than that exhibited by said windings to D.C. and ringing currents; and this increased transformer impedance, plus the effective short circuit provided by capacitor C1 at audio frequencies, permits the transformers T1 and T2 to operate in a desired manner in transferring signals to and from the repeater in both directions for amplification.

Voice signals appearing on the East line, for example between pins 5 and 6, are developed across primary windings 43 and 44 of transformer T1 and are coupled through said transformer T1 to the secondary winding 46 thereof. By the same token, voice currents appearing on the West line between pins 3 and 4 are coupled through transformer T2 to the secondary winding 50 thereof. Secondary winding 46 of transformer T1 is shunted by a T-pad attenuation network designated generally P1, and comprising resistors R3, R4 and R5 connected as shown. A similar such pad, designated P2, is shunted across the secondary winding 50 of transformer T2.

Resistors R3, R4, and R5, i.e. pad P1, as well as their counterparts (pad P2) in the West line portion of the circuit, form a passive 1,000 ohm, 3 to 10 db. loss network, inserted effectively between the telephone line and the hybrid bridge, and acting to isolate the telephone line from the hybrid network to minimize the effect of telephone line impedance variations upon the repeater operation. If the East line is open circuited, the East pad P1 assures that an impedance no higher than 1530 ohms is reflected back toward the East hybrid; and if the East line is short circuited, an impedance of not less than 660 ohms is reflected back toward its hybrid. A similar function is provided, for the West line, by pad P2. As a result, impedance variations during open and short circuit conditions of the lines are vastly reduced. Each hybrid balance network is accordingly required to duplicate impedances only within a certain predetermined impedance range; and the use of the passive attenuation networks P1 and P2 therefore reduces the complexity of the balance problem, and enables the use of simple variable controls in place of earlier complex component strapping or wiring selections for hybrid balancing. The additional db loss of the pads P1 and P2 (and of the pads P3 and P4) to be described hereinafter), is easily overcome by the substantial db gain capability of the amplifiers incorporated in the repeater.

The amplifiers 30 and 31 (see FIGURE 2) take the form of transistors Q1 and Q2 arranged in conventional common emitter amplifier circuits, and adapted to provide a maximum working gain of about 43 db each. The transistors Q1 and Q2 are physically located in the equipment at the locations designated Q*a* and Q*b* in FIGURE 1A. Q*a* comprises a socket for the reception of transistor Q1, while Q*b* comprises a socket for the reception of transistor Q2. The use of such transistor sockets permits the transistors to be replaced as needed, and also permits a better matching of the transistors Q1 and Q2 to be effected during initial installation of the transistors.

The transistors Q1 and Q2 may be of PNP type 2N270. Their maximum working again of about 43 db actually produces about 23 db gain available for line use under optimum conditions, with the transformers, hybrids, and pad losses accounting for about 20 db of loss. The audio input of each amplifier is applied off-ground into the base through coupling capacitor C2 in the East amplifier and through coupling capacitor C3 in the West amplifier. Comparing FIGURES 2 and 3, it will be seen that signals from the East line are developed across gain control 34 (so designated in both figures) and are then taken from said gain control via terminals 51 and 52, and thence via coupling capacitor C3 to the base of transistor Q2 comprising the West amplifier. Similarly, the input to transistor Q1 is derived from gain control 35 and is coupled via terminals 53 and 54 and thence via capacitor C2 to the input of transistor Q1.

Terminals 51 and 52 are normally shorted to one another, and terminals 53 and 54 are similarly so normally shorted to one another, when the repeater is employed in connection with a loaded telephone line. In this respect, the repeater is designed to provide uniform or flat gain throughout the audio frequency range when the repeater is properly balanced against a terminated loaded telephone line or equipment. Such loaded lines normally exhibit, as is appreciated by those skilled in the art, a substantially flat frequency response. On lines with irregular (i.e. not flat) frequency response, the repeater will still provide gain, but it will not improve or flatten the irregular frequency response. Accordingly, in such cases an equalizer network, comprising for example a reactive impedance such as that designated 55 or 56, can be inserted between terminals 51 and 52 and/or between terminals 53 and 54, to compensate for the use of the repeater in connection with a non-loaded cable facility in one or both directions of transmission. With the provision of equalizer networks such as 55 or 56, the useful gain of the transmitter amplifier Q1 or Q2 is effectively increased near the higher end of the audio range thereby to compensate for increased losses which occur in non-loaded cables at this higher audio frequency end of the range; and other improvements, already described, are effected whereby equalization approximating that obtained by adding loading coils to the cable is effected by the use of the equalizer network or networks shown.

The equalizer components 51, 52, 53, 54, 55 and 56, normally included to provide the equalizer function described in the preceding paragraph, may also readily be connected as a low pass filter shown in FIGURE 5 to further reduce the amplifier gain above 3000 cycles. This is desirable since the flat impedance characteristic of loaded cable previously described is flat only up to approximately 3300 cycles. At some frequency above this, the impedance varies sharply, thus causing considerable hybrid unbalance at this frequency and a consequent tendency to howl or sing. Since this tends to reduce the attainable gain within the useful range, the low pass filter will provide further improvement in performance.

Continuing with the description of the circuit shown in FIGURE 3, it will be noted that the output of the East amplifier transistor Q1 passes through the primary winding 57 of transformer T3 (corresponding to winding *p* of transformer T3 in FIGURE 2); and the output of transistor Q2 is similarly developed across transformer T4. Transformers T3 and T4 are the output-hybrid transformers. The collector A.C. output of transistor Q1 is bypassed to its emitter in increasing amounts at higher frequencies by the action of frequency roll-off capacitor C4 in the East amplifier, and by capacitor C5 in the West amplifier; and the purpose of these roll-off capacitors C4 and C5 is to reduce the output of the amplifiers at frequencies above 3,000 cycles and to increase the singing path losses above the desired audio frequency range. Capacitors C4 and C5 also provide convenient surge voltage suppression to protect their associated transistor collectors.

The transistor output-hybrid transformers, T3 in the East amplifier, and T4 in the West amplifier, are each equipped with two secondary windings. One of these windings, designated 58, 58′ in transformer T3, is center-tapped as shown to the battery plus terminal 1, and is provided to effect a balanced voltage corresponding to the balanced voltage appearing across the windings *a–b* of FIGURE 2. In this respect, therefore, the connection of the winding portions 58–58′ and the gain control 34 corresponds to that already described in reference to FIGURE 2. By the same token, the lower end of winding portion 58′ is ultimately coupled to an East hybrid balance control 19 by means to be described, whereby this portion of the circuit corresponds to and is connected in the manner of hybrid balance control 2 of FIGURE 2. A similar such arrangement appears in the West amplifier section, in that center-tapped secondary winding 59–59′ is provided in association with gain control 35 and is ultimately coupled to the West hybrid balance control 18.

It will be appreciated that the windings 58–58′ of transformer T3 and windings 59–59′ of transformer T4, comprise the first of the two secondary windings mentioned, in each of these output hybrid transformers T3 and T4. The second secondary winding in each of these output hybrid transformers comprises the winding 60 in transformer T3 and the winding 61 in transformer T4. Winding 60 is connected off ground to the East monitor pin jack 16 whereas the winding 61 is similarly connected off ground to the West monitor pin jack 15. Each of these pin jacks 15 and 16 acts to provide a means of monitoring the signal currents, e.g. by a lineman's hand set during setup of the equipment. In essence, the jacks 15 and 16 can be employed to monitor the audio output of the equipment during hybrid balance adjustments, and during normal operation, without seriously unbalancing the hybrid network, and without otherwise interfering with the in-service operation of the repeater. Moreover, these jacks can be employed for inserting 300–3,000 cycle test tones from an audio oscillator, while adjusting the East hybrid balance control for a minimum tone as heard on the West monitor jack 15 to obtain a balanced hybrid, and vice versa.

As mentioned previously, the signalling bypass shown in FIGURE 3A, comprising certain transformer windings associated with capacitor C1, are designed to permit a signalling bypass for D.C. and ringing currents while still permitting effective transfer of audio signals to and from the repeater. The explanation of this operation given previously, while applicable in theory, does not fully apply in practice since the change of impedance exhibited by the transformer windings 43, 44, 47, and 48, and by the capacitor C1, is a function of the frequency applied. At the low end of the audio range, therefore, the capacitor C1 may exhibit a substantial impedance, notwithstanding the fact that it should theoretically exhibit substantially a short circuit; and at this same low end of the audio frequency range, the transformer windings may not have achieved sufficient impedance for the transformer to exhibit full efficiency. If efforts are made to overcome these problems at the low end of the audio range, one tends to attenuate the signalling currents being bypassed. As a result, the system approaches its theoretical operation only at the high end of the audio frequency range. Moreover, due to the impedance which is exhibited by capacitor C1 at the low end of the audio range, audio voltages can be developed across capacitor C1 and transferred therethrough back to the input thus providing an undesired feedback of audio signals; and this in turn limits the gain of the repeater which can be achieved in practice.

In order to overcome these disadvantages, secondary winding 58–58′ of transformer T3 is not coupled directly to the East hybrid balance 19, but is coupled via attenuation network P3 as well as via a transformer T5. Similarly, the secondary winding 59–59′ of transformer T4 is coupled to the hybrid balance 18 via an attenuation network P4 and a transformer T6. The attenuation networks P3 and P4 correspond precisely to the attenuation networks P1 and P2 already described; and transformers T5 and T6 correspond precisely to transformers T1 and T2 already described, i.e. by the arrangement shown, the hybrid balance networks are designed to include components which correspond to like components appearing at the input end of the repeater.

Transformer T5 thus includes windings 62 and 63 which are separated by a third electrostatic shielding winding 64, and said windings 62 through 64 inclusive thus correspond to windings 43 through 45 inclusive of transformer T1. Transformer T5 further includes a winding 65 which corresponds to winding 46 of transformer T1.

A similar relationship will immediately be seen between the several windings of transformer T6 and the corresponding windings of transformer T2. In addition, the secondary windings of transformers T5 and T6 are interconnected to one another via a capacitor C6 which corresponds in parameter value and connection to capacitor C1 already described. By reason of this overall arrangement, therefore, the East hybrid balance actually comprises not only a resistive potentiometer 19 but also a transformer and attenuation network located at the input of the East amplifier. A similar such arrangement is employed adjacent both the the hybrid balance and input portions of the West amplifier.

The addition of the two transformers T5 and T6, and of capacitor C6, having the same parameter values and impedance variations as are imposed by input transformers T1 and T2 and capacitor C1, results in a number of advantages. By way of example, it will be noted that, by the arrangement selected, a feedback occurs in the hybrid balance portions of the circuit which is equal and opposite to the feedback, which normally occurs through capacitor C1, throughout the entire audio range. The use of the particular hybrid balance networks shown also causes said hybrid networks to have a frequency response characteristic which is substantially the same as that of the signalling bypass portions at the input end of the repeater so that undesirable impedance variations contributed by the signalling bypass portions of the repeater at its input end are effectively counteracted in the hybrid balance portion of the circuit. The negative feedback provided at the hybrid balances, by counteracting the positive feedback at the signalling bypass, effectively permits higher gains to be achieved; and the impedance variations of the hybrid networks, corresponding essentially to the impedance variations at the input end introduced by the signalling bypass, permit a more accurate hybrid balance to be achieved.

In effect, what the new arrangement, shown in FIGURE 3, accomplishes, is to recognize that there is actually another impedance Z3 (shown in FIGURE 2) present in the system. Impedance Z3 comprises the signalling bypass portion of the repeater and has been previously ignored in simplified repeater structures. The improved repeater of the present invention takes this additional impedance Z3 into account and adds an additional compensating network Z3′ (also shown in FIGURE 2) to compensate for the disadvantages which are otherwise produced by signalling bypass. The end result of the arrangement therefore is that far more accurate balance can be achieved and higher gains can be utilized during initial setup of the equipment and during in-service operation than has been possible heretofore in simplified repeater structures.

The overall system shown in FIGURE 3 may thus be summarized by stating that it contains two identical transistor amplifiers, one to amplify voice currents in the East-to-West direction, and the other to increase the signal level of voice currents in the West-to-East direction. The amplifiers are associated with means providing a signalling bypass for D.C. and ringing currents; and the amplifiers are prevented from interacting with one another by directional circuit devices, i.e. hybrid networks which are so designed that they provided a feedback and an impedance variation which compensates for the signalling bypass feedback and impedance variations which otherwise would detract from proper operation of the system.

The hybrid networks themselves further include a center tapped transformer whose output is applied to two arms of a balanced bridge (compare FIGURE 2). One arm of this bridge is the telephone line, and the second arm of the bridge network is the hybrid balance control circuit. When the hybrid balance control Z2–Z2′ is set to duplicate the impedance of the telephone line, equal and opposite currents flow through the center of the bridge, causing cancellation of voltage at that point. By connecting the two amplifiers in the center arm of the balanced bridge, therefore, the voice frequency output of one amplifier is prevented from entering the input of the second amplifier.

At any time when the loss of the signal, due to balance cancellation, is less than the gain of the two amplifiers, a ring-around path will exist which causes the amplifiers to oscillate at the frequency of the least loss; and this electrical loop is called the singing path. "Singing" and "hybrid howling" oscillatory signals are heard when the amplifier gains exceed the singing path losses. The more precisely the hybrid balance network impedance duplicates the telephone line impedance, the greater the singing path loss and consequently the higher usable gain obtainable from the two amplifiers before the singing point is reached. With a poorly adjusted hybrid balance network, a very small amount of amplifier gain will overcome the low loss of the hybrids and result in singing at very low gain control settings. It is seen therefore that the successful operation of the hybrid repeater, is dependent upon the quality of the hybrid balance control settings in both directions.

The occurrence of singing currents at off-balance settings permits these currents, monitored at jacks 16 and 15, to be utilized in actually setting up the equipment; and as a result, the system can be set up far more quickly than has been possible heretofore. A typical setup procedure can be as follows:

Upon installation of the repeater into its mounting box, a lineman's or central office test hand set is first inserted into the West monitor jack 15. The common gain control 34–35 is then rotated until a hybrid howl or singing condition begins, whereafter the gain control is lowered slightly until the howl just stops. A call is preferably then completed between two standard telephone sets over the line in which the repeater has been installed; and if such call is placed, it should not be placed with another lineman's test set, since its impedance is not the same as a standard telephone station instrument. With the test call in talking condition (i.e. the line is then neither short-circuited nor open-circuited), the gain control is again raised until the singing condition returns. The East hybrid balance control 19 is then rotated until the singing either stops or suddenly makes a distinctive change in pitch.

The lineman's hand set is then removed from jack 15 and inserted in jack 16. If no howl is detected, the gain control is increased until a singing condition once more starts. With the repeater in this singing condition, the West hybrid balance control 18 is adjusted until the singing stops or makes a distinctive change in pitch.

The objective in the balancing procedure described above is of course to set the East and West hybrid balance controls in the position which permits the highest gain control setting without a hybrid howling condition. The singing can, of course, be stopped at any time by simply lowering the gain control. After both balance controls have been set to obtain the highest gain control without singing, the gain control should be raised to the point where singing just returns; and if necessary, the hybrid balance controls can then be separately finally adjusted to the point where the singing tone changes from a low pitch to a high pitched tone, with the controls preferably being set so that the high pitched tone persists as near to the point of low pitched singing as possible. With this condition achieved, the gain control can be again lowered very slightly until the high pitched singing stops. The parties on the test call should be requested to hang up their telephones to unterminate both sides of the repeater. The maximum practical usuable gain is now determined by the idle line condition singing points, and the gain control should accordingly be set as high as possible without singing, or at a point where the repeater sings at a low level not causing cross-talk interference into other circuits along the same line route. The gains in the two operating directions will be equal, so long as the hybrid networks are equally balanced; but they may vary slightly with different line connections.

After a proper initial setting, the gain balance in the two operating directions may vary on the order of 1.5 db for each 100 ohms of line impedance departure from the initial setting values; but this low value of variation is entirely tolerable and will not in fact be ordinarily noticed in practice.

If desired, although it is entirely unnecessary, test equipment can be employed in place of a lineman's hand set. For example, a "tone null" method of balance can be utilized in which a tone of about 1400 cycles is inserted successively into the East and West monitor jacks 16 and 15; and the gain and hybrid controls are then adjusted to achieve a null point. To effect an even more precise setting, a pair of vacuum tube voltmeters can be coupled to the monitor jacks 15 and 16 respectively, whereby the voltage outputs at these jacks can be simultaneously observed. The repeater is caused to sing by raising the gain control; and the hybrid balance controls are adjusted to produce equal singing conditions on the two monitor jacks. By observing the vacuum tube voltmeters coupled to jacks 15 and 16, the equipment may be aligned not only to obtain equal voltages from both monitor jacks at any one singing power level, but also to make the two voltages track equally downward as the gain control is decreased through the near singing condition into a non-singing condition. When the hybrid balance controls are improperly adjusted, the voltage on the two monitor jacks will vary in different directions and at unequal rates with a slight change in either hybrid balance control adjustment; but at the desired point of equal gains, or exact hybrid balance control adjustment, the two monitor jack voltages will lock together, and will vary in the same direction and in equal amounts with a slight touch on either hybrid balance control.

It will be appreciated that the techniques utilizing test equipment, described above, need be employed only when a highly sophisticated adjustment is desired for some reason; and in practice, such sophistication is not necessary. Entirely adequate and noticeable improvement can be achieved through the use of a lineman's hand set alone.

One additional feature of the circuit shown in FIGURE 3 should be noted. As mentioned previously, an equalizer network, such as network 55 or 56, is preferably inserted in series with each amplifier, or with an appropriate one of said amplifiers, when said amplifier is employed with a non-loaded cable thereby to adjust the frequency response of the amplifier. Since an unloaded cable exhibits an impedance which drops at its high frequency end, it is, as mentioned, also highly desirable to adjust the impedance characteristic of the balance network to correspond to that of the line when a given amplifier is associated with an unloaded line; and to this effect, therefore, the balance network should be disposed in series with a capacitor, or shunted by a capacitor, or both. Capacitor C7, shown in FIGURE 3, is intended to show one possible form which this arrangement may take, i.e. a capacitor disposed in series with hybrid balance potentiometer 19; and it will be appreciated that capacitor C7 may be supplemented by or replaced by a capacitor shunted across the potentiometer 19 for the purposes described.

The arrangement thus far described in reference to FIGURES 3 and 3A, has assumed that, in operation, the repeater is permanently energized, i.e. a battery connected between terminals 1 and 2 is normally always so connected into the circuit whereby all of the various operations described previously occur constantly. Such a permanently energized condition for the repeater has certain disadvantages. For one, it necessarily limits battery life. In addition, the use of a constantly energized repeater normally requires that separate idle line terminations also be provided. More importantly, permanent repeater energization necessarily permits the possibility of singing conditions even though audio signals are not being transferred via the repeater along the telephone line associated with that repeater; and such singing conditions in turn may cause cross-talk. To avoid such cross-talk, therefore, and as already described above in reference to proper set-up procedure, it is normal practice for the gain of the repeater to be lowered sufficiently to avoid such singing conditions during idle periods, whereby the gain of the repeater is necessarily undesirably limited.

Figure 4:
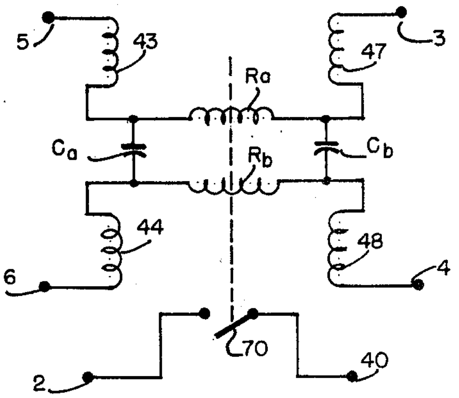
FIGURE 4 illustrates a modified portion of the circuit shown in FIGURE 3, constructed in accordance with a further embodiment of the present invention.
Figure 4:
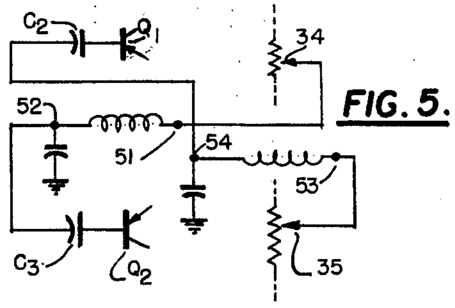

These various disadvantages can be avoided in accordance with a modification of the present invention by so arranging the energization portion of the repeater that the repeater is deenergized or turned off during idle conditions. One possible arrangement constructed in accordance with this concept is illustrated in FIGURE 4. The portion of the circuit shown in this figure, associated with the designated terminals 5, 6, 3 and 4, corresponds to that already described in reference to FIGURES 3 and 3A, i.e. it comprises a signalling bypass for D.C. and ringing currents. In the modified form of the invention, the arrangement already described in reference to FIGURE 3A is altered somewhat to replace capacitor C1 by a pair of capacitors C*a* and C*b*; and a bifilar relay winding R*a* and R*b* is inserted therebetween, in the manner shown, to control the movement of an associated relay switch blade 70. Switch blade 70 is in turn connected between the battery minus terminal 2, and terminal 40 already described in reference to FIGURE 3. In this particular arrangement, the battery plus terminal 1 is connected to ground.

The overall arrangement thus shown in FIGURE 4 is one wherein the switch blade 70 interposes a normally open contact in one of the battery leads whereby the repeater is normally deenergized, i.e. is deenergized during idle conditions. When a subscriber picks up his telephone receiver and thereby completes the D.C. circuit to his telephone set through the repeater signalling bypass, he simultaneously turns on the repeater. In particular, the D.C. currents flowing through the signalling bypass (i.e. associated with terminals 3, 4, 5, and 6, already described) effects current flow through the bifilar relay windings R*a* and R*b* thereby to close normally open switch blade 70, completing the battery lead circuit between terminal 2 and terminal 40 to energize the repeater. The repeater will remain on until the subscriber breaks the D.C. circuit by hanging up his telephone. The bifilar windings R*a* and R*b*, as well as the split capacitor arrangement C*a* and C*b* are selected to preserve balance in the energization portion of the circuit.

As an alternative arrangement, and to avoid the necessity of a separate relay, the arrangement shown in FIGURE 3 can be employed directly with the exception that the battery plus terminal 1, rather than being permanently connected to ground, can be connected to the "C-lead" normally found in most telephone switchboards. As is commonly known, this C-lead is in turn connected to ground when a call is placed, but is open-circuited during idle periods. By connecting the battery plus terminal of the repeater to the C-lead, therefore, the battery circuit for the repeater is completed only when a call is placed.

The arrangements described above for deenergizing the repeater during idle periods, i.e., by employing the C-lead as a repeater power return or by deenergizing the repeater during idle periods through use of a relay, find particular utility in the repeaters shown in the present invention, using transistors. However, such arrangements can be employed with equal facility in any of many other repeaters known at the present time. In all such cases, battery life is increased. In addition, singing currents are eliminated during idle periods and the repeater can therefore be set up for higher gains during operating conditions inasmuch as the gain need not, as would otherwise be the case, be initially adjusted to a value low enough to avoid singing during idle conditions. Any such singing during idle conditions is completely eliminated by deenergizing the repeater rather than by a prior limitation in the repeater gain effected during initial repeater set up. The deenergization of the repeater during idle conditions moreover avoids the need of providing separate idle line terminations, which is often the practice in repeater systems employed at the present time; and, as a result, increases the versatility and possible use of the system to the point where it can be used on individual subscriber lines wherein the cost of providing a separate idle line termination would not be economically justifiable. Moreover, by in effect removing (through deenergization) idle repeaters from the telephone system, line impedance fluctuations which would otherwise occur when a repeater went to an idle condition, are eliminated, thereby increasing the amplification efficiency of operating repeaters still in use.

While I have thus described a preferred embodiment of my invention, many variations will be suggested to those skilled in the art. It must therefore be stressed that the foregoing description is meant to be illustrative only and should not be considered limitative of my invention; and all such variations and modifications as are in accord with the principles described, are meant to fall within the scope of the appended claims.

What I claim is:

1. In a voice frequency repeater, bidirectional amplification means comprising a pair of amplifiers having inputs and outputs, coupling means including T-pad attenuation network means for coupling said amplifiers to a telephone line, and a pair of adjustable balancing networks coupled to said amplifiers respectively for preventing said amplifiers from interacting with one another, each of said adjustable balancing networks including further T-pad attenuation network means exhibiting an impedance substantially identical to that of said first mentioned T-pad network means, said coupling means including first transformer means, each of said adjustable balancing networks including second transformer means having parameter values substantially identical to said first transformer means whereby frequency responsive impedance variations of said transformer coupling means are accompanied by like frequency responsive impedance variations in said balancing networks.

2. The structure of claim 1 including first capacitor means coupled to said first transformer means, said first capacitor means exhibiting a relatively high impedance to D.C. and ringing currents and exhibiting a lower impedance to audio frequencies whereby said first transformer means and said first capacitor means cooperate with one another to transfer audio signals to and from said repeater while also providing a signalling bypass for said D.C. and ringing currents, and second capacitor means coupled to said second transformer means in said adjustable balancing networks, said second capacitor means being substantially identical in magnitude to said first capacitor means thereby compensating, at said balancing networks, for any undesired feedback of audio signals occurring via said first capacitor means.

3. In a voice frequency repeater of the type comprising a pair of amplifiers having signal coupling means for coupling said amplifiers between spaced points on a telephone line to effect bidirectional amplification of voice currents on said line, said repeater also including a pair of adjustable balancing networks coupled between said spaced points on said telephone line and said amplifiers respectively for preventing interaction of said amplifiers during said bidirectional amplification, the improvement which comprises first reactive impedance means forming a portion of said signal coupling means and acting as a signalling bypass for D.C. and ringing currents, second reactive impedance means having a frequency responsive impedance characteristic substantially identical to that of said first reactive impedance means in said signalling bypass, said second reactive impedance means forming a portion of said balancing networks whereby any impedance variations of, and undesired signal feedbacks occurring in, said signalling bypass are nullified by compensating impedance variations and signal feedbacks in said balancing networks, said pair of balancing networks respectively including a pair of manually variable impedance means individually settable to impedance values which are substantially independent of frequency variations on said telephone line, further manually variable impedance means coupled to both said amplifiers, and a single manually adjustable gain control coupled to said further manually variable impedance means for simultaneously controlling the gain of both said amplifiers.

4. A voice frequency repeater comprising a pair of amplifiers, means for coupling said repeater between spaced points on a telephone line to effect bidirectional amplification of voice currents on said line, and a pair of adjustable balancing networks coupled between said spaced points on said line and said amplifiers for reducing interaction of said amplifiers during said bidirectional amplification, said coupling means including a first pair of transformers for coupling signals between said amplifiers and said line, said balancing networks including a second pair of transformers having windings and parameter values substantially identical to those of said first pair of transformers whereby said balancing networks exhibit a frequency reponsive impedance variation similar to that of said first pair of transformers.

5. The repeater of claim 4 wherein each transformer of said first and second pairs of transformers includes a pair of windings, first capacitor means interconnecting the pairs of windings in each of said first pair of transformers thereby to form a frequency responsive input circuit adapted to bypass D.C. and ringing currents away from said amplifiers while coupling audio signals to said amplifiers for amplification, and second capacitor means interconnecting the pairs of windings in said second pair of transformers for causing said balancing networks to exhibit a similar frequency responsive characteristic.

6. The structure of claim 4 including impedance means coupled to said first pair of transformers and cooperating therewith to form a signalling bypass for D.C. and ringing currents, said impedance means operating, during at least part of the audio range being amplified, to effect an undesired feedback of signals via said signalling bypass, and means coupled to said second pair of transformers for effecting a feedback of signals equal and opposite to the feedback of signals occurring in said signalling bypass.

7. The voice frequency repeater of claim 4 wherein said pair of amplifiers comprise a pair of transistor amplifiers, said pair of adjustable balancing networks each including a gain control, means coupling the base electrodes of said transistor amplifiers to different ones of said pair of gain controls respectively, and terminal means forming a portion of said coupling means adapted to permit the insertion of variable reactive impedance means in the connections between said gain control means and said transistor amplifier bases thereby to permit variation in the frequency response characteristics of at least one of said transistor amplifiers when said repeater is employed for amplifying signals on a non-loaded telephone line.

References Cited by the Examiner

UNITED STATES PATENTS

| | | | |
|---|---|---|---|
| 1,734,113 | 11/29 | Clark et al. | 179—170 |
| 2,601,302 | 6/52 | Lalande | 179—170 |
| 2,812,388 | 11/57 | Thomas | 179—170 |
| 2,854,514 | 9/58 | Ensink et al. | 179—170 |

ROBERT H. ROSE, *Primary Examiner.*